(12) United States Patent
Dykstra et al.

(10) Patent No.: US 10,024,151 B2
(45) Date of Patent: Jul. 17, 2018

(54) CONTROLLING A BOTTOM HOLE ASSEMBLY IN A WELLBORE

(71) Applicant: Halliburton Energy Services, Inc., Houston, TX (US)

(72) Inventors: Jason D. Dykstra, Carrollton, TX (US); Zhijie Sun, Plano, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/035,448

(22) PCT Filed: Dec. 6, 2013

(86) PCT No.: PCT/US2013/073673
§ 371 (c)(1),
(2) Date: May 9, 2016

(87) PCT Pub. No.: WO2015/084403
PCT Pub. Date: Jun. 11, 2015

(65) Prior Publication Data
US 2016/0290117 A1 Oct. 6, 2016

(51) Int. Cl.
*G06G 7/48* (2006.01)
*E21B 44/00* (2006.01)
(Continued)

(52) U.S. Cl.
CPC .............. *E21B 44/00* (2013.01); *E21B 7/06* (2013.01); *E21B 7/10* (2013.01); *E21B 44/04* (2013.01); *E21B 44/06* (2013.01); *E21B 47/024* (2013.01); *G06F 17/11* (2013.01); *G06F 17/16* (2013.01); *G06F 17/5009* (2013.01); *E21B 10/00* (2013.01); *E21B 17/16* (2013.01); *G06F 2217/16* (2013.01)

(58) Field of Classification Search
CPC ........................................................ E21B 44/00
USPC ............................................................ 703/10
See application file for complete search history.

(56) References Cited

U.S. PATENT DOCUMENTS 6,233,524 B1 5/2001 Harrell et al.
6,542,782 B1 4/2003 Lu
(Continued)

OTHER PUBLICATIONS

Downton et al.: Challenges of Modeling Drilling Systems for the Purposes of Automation and Control; Proceedings of the 2012 IFAC Workshop on Automatic Control in Offshore Oil and Gas Production; May 31-Jun. 1, 2012. Trondheim, Norway; pp. 201-210.*
(Continued)

*Primary Examiner* — Hugh Jones
(74) *Attorney, Agent, or Firm* — John Wustenberg; Parker Justiss, P.C.

(57) ABSTRACT

Techniques for controlling a bottom hole assembly (BHA) include determining a model of BHA dynamics based on sensor measurements from the BHA; determining, based on the model of BHA dynamics, an objective function including a predicted future deviation from a planned wellbore path; determining a control input to the BHA that satisfies the objective function for a set of operating conditions of the BHA; generating, at a secondary system, relational information that relates the control input to the set of operating conditions; and transmitting the relational information from the secondary system to the BHA.

19 Claims, 9 Drawing Sheets

(51) Int. Cl.

| | | |
|---|---|---|
| *E21B 7/06* | (2006.01) | |
| *E21B 7/10* | (2006.01) | |
| *E21B 44/04* | (2006.01) | |
| *E21B 44/06* | (2006.01) | |
| *E21B 47/024* | (2006.01) | |
| *G06F 17/11* | (2006.01) | |
| *G06F 17/16* | (2006.01) | |
| *G06F 17/50* | (2006.01) | |
| *E21B 10/00* | (2006.01) | |
| *E21B 17/16* | (2006.01) | |

(56) References Cited

U.S. PATENT DOCUMENTS

| | | | |
|---|---|---|---|
| 6,732,052 B2 | 5/2004 | Macdonald et al. | |
| 6,920,085 B2 | 7/2005 | Finke et al. | |
| 7,054,750 B2 | 5/2006 | Rodney et al. | |
| 7,629,764 B2 | 12/2009 | Shoemaker et al. | |
| 7,966,166 B2 * | 6/2011 | Thambynayagam | E21B 43/00 700/28 |
| 8,190,369 B2 | 5/2012 | Moos et al. | |
| 8,453,764 B2 | 6/2013 | Turner et al. | |
| 2003/0015351 A1 | 1/2003 | Goldman et al. | |
| 2003/0028324 A1 * | 2/2003 | Xiao | G01V 3/38 702/7 |
| 2007/0032958 A1 | 2/2007 | Chen | |
| 2007/0236221 A1 * | 10/2007 | Merchant | E21B 47/022 324/339 |
| 2008/0314641 A1 * | 12/2008 | McClard | E21B 7/04 175/57 |
| 2009/0201170 A1 | 8/2009 | Reckmann et al. | |
| 2009/0260880 A1 * | 10/2009 | Thambynayagam | E21B 43/00 175/45 |
| 2010/0191516 A1 * | 7/2010 | Benish | E21B 43/00 703/10 |
| 2011/0172976 A1 * | 7/2011 | Budiman | E21B 47/04 703/2 |
| 2012/0046868 A1 | 2/2012 | Tchakarov et al. | |
| 2012/0109382 A1 | 5/2012 | Dashevskiy et al. | |
| 2013/0066471 A1 | 3/2013 | Wang et al. | |
| 2013/0282342 A1 | 10/2013 | Bailey et al. | |

OTHER PUBLICATIONS

Matheus et al.: "Drilling Automation: Novel Trajectory Control Algorithms for RSS", SPE127925; 2010; pp. 1-10.*

Pirovolou et al.: Drilling Automation: An Automatic Trajectory Control System; SPE 143899; 2011; pp. 1-8.*

Smith et al.: The Road Ahead to Real-Time Oil and Gas Reservoir Management; Trans IChemE, vol. 76, Part A, Jul. 1998; pp. 539-552.*

PCT International Search Report and Written Opinion of the International Searching Authority, PCT/US2013/073673, dated Sep. 4, 2014, 11 pages.

* cited by examiner

| Region | Control Law |
|---|---|
| ① $x_1 \leq 1, x_2 \geq -1, x_2 - x_1 \geq 1$ | $u = [1\ -1]x$ |
| ② $x_1 \leq 1, x_2 \geq -1, x_2 - x_1 \leq 1$ | $u = -1$ |
| ③ $x_1 \leq 1, x_2 \leq -1, x_2 - x_1 \leq 1$ | $u = [0\ 1]x$ |
| ④ $x_1 \geq 1, x_2 - x_1 \geq 1$ | $u = [2\ -1]x - 1$ |
| ⑤ $x_1 \geq 1, x_2 \geq -1, x_2 - x_1 \leq 1$ | $u = [2\ -1]x - 1$ |

CONTROLLING A BOTTOM HOLE ASSEMBLY IN A WELLBORE

CROSS-REFERENCE TO RELATED APPLICATIONS

This application is a U.S. National Phase Application under 35 U.S.C. § 371 and claims the benefit of priority to International Application Serial No. PCT/US2013/073673, filed on Dec. 6, 2013, the contents of which are hereby incorporated by reference.

TECHNICAL BACKGROUND

This disclosure relates to management (e.g., automated) of wellbore operation for the production of hydrocarbons from subsurface formations.

BACKGROUND

Drilling for hydrocarbons, such as oil and gas, typically involves the operation of drilling equipment at underground depths that can reach down to thousands of feet below the surface. Such remote distances of downhole drilling equipment, combined with unpredictable downhole operating conditions and vibrational drilling disturbances, creates numerous challenges in accurately controlling the trajectory of a wellbore. Compounding these problems is often the existence of neighboring wellbores, sometimes within close proximity of each other, that restricts the tolerance for drilling error. Drilling operations typically collect measurements from downhole sensors, located at or near a bottom hole assembly (BHA), to detect various conditions related to the drilling, such as position and angle of the wellbore trajectory, characteristics of the rock formation, pressure, temperature, acoustics, radiation, etc. Such sensor measurement data is typically transmitted to the surface, where human operators analyze the data to adjust the downhole drilling equipment. However, sensor measurements can be inaccurate, delayed, or infrequent, limiting the effectiveness of using such measurements. Often, a human operator is left to use best-guess estimates of the wellbore trajectory in controlling the drilling operation.

DETAILED DESCRIPTION

Figure 1:
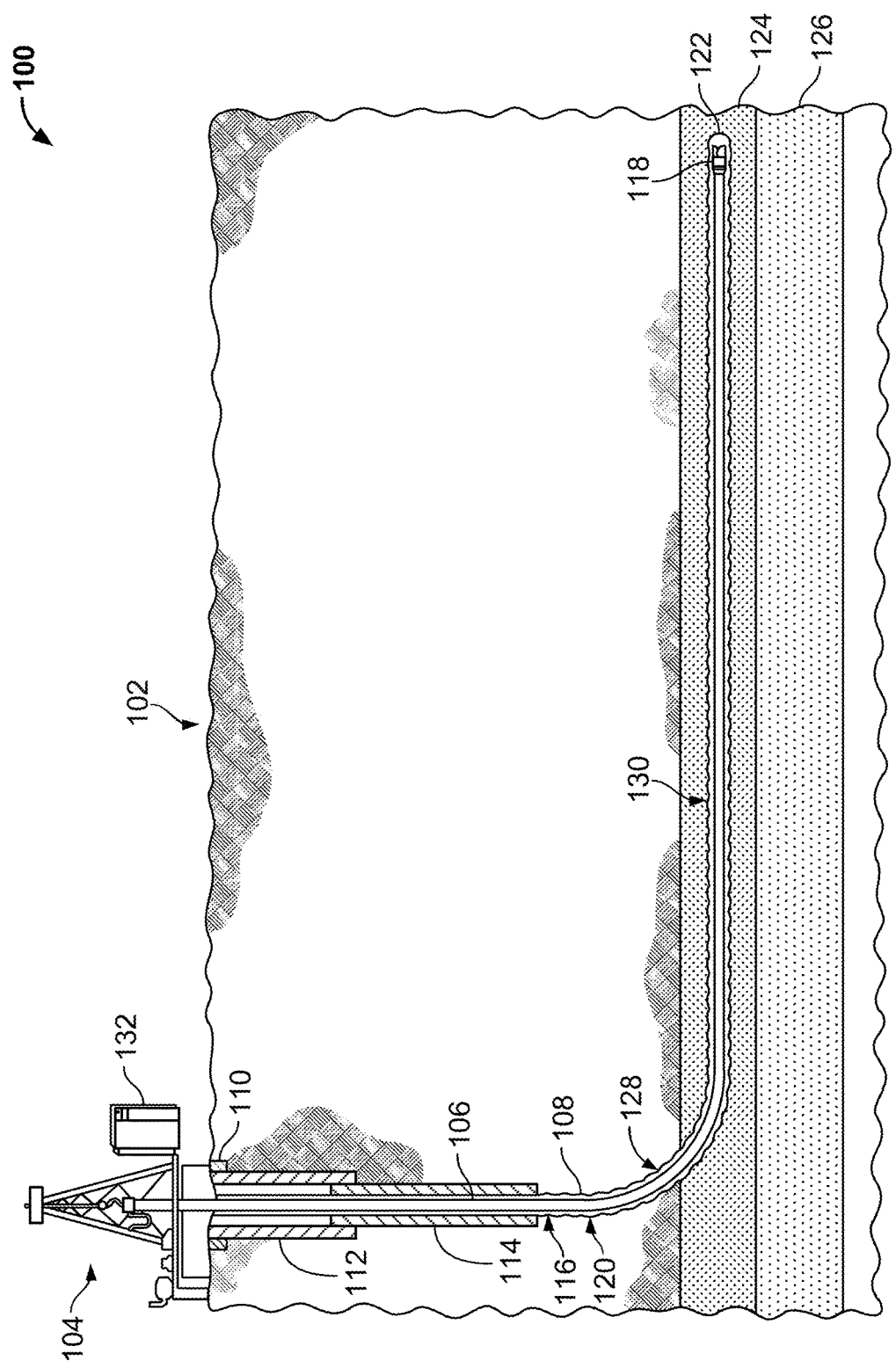
FIG. 1 illustrates an example of an implementation of at least a portion of a wellbore system in the context of a downhole operation.

This disclosure describes, generally, automated control of wellbore drilling operations by making model-based predictive control (MPC) decisions for the BHA. In particular, techniques are described in which a secondary system generates relational information that relates BHA control inputs to different operating conditions, and provides the relational information to the BHA to implement MPC operations. The secondary system may be above the surface (e.g., as part of an above-surface controller) or may be below the surface (e.g., as a downhole module together with or separate from the BHA). The relational information may be stored locally at the BHA or, in some examples, may be stored apart from, and remotely accessible by, the BHA. During drilling, the BHA accesses the relational information to determine control inputs for different operating conditions. In some examples, the relational information may include an input-output function, such as a lookup table.

The relational information may be generated by the secondary system based on a model-based predictive control (MPC). The MPC is based on a model of BHA dynamics, which is determined based on sensor measurements and may be used to estimate predictions of wellbore trajectory. In some examples, it may be desirable to control the BHA such that an objective function is satisfied, which may include a combination of one or more predicted costs of drilling over a future horizon of time. The secondary system may generate the relational information by pre-computing BHA control inputs that satisfy an objective function for different sets of operating conditions.

The secondary system may monitor the performance of the drilling operation, and determine whether to update the model of BHA dynamics. For example, the model of BHA dynamics may diverge from the true wellbore environment for various reasons, including changes in downhole conditions or modeling inaccuracies and uncertainties. If the secondary system determines that the model of BHA dynamics diverges significantly from sensor measurements, then the secondary system may update the model of BHA dynamics and generate corresponding updated relational information, which it then provides to the BHA.

In a general implementation, a computer-implemented method of controlling a bottom hole assembly (BHA) includes determining a model of BHA dynamics based on sensor measurements from the BHA; determining, based on the model of BHA dynamics, an objective function comprising a predicted future deviation from a planned wellbore path; determining a control input to the BHA that satisfies the objective function for a set of operating conditions of the BHA; generating, at a secondary system, relational information that relates the control input to the set of operating conditions; and transmitting the relational information from the secondary system to the BHA.

Other general implementations include corresponding computer systems, apparatus, and computer programs recorded on one or more computer storage devices, each configured to perform the actions of the methods. A system of one or more computers can be configured to perform operations to perform the actions. One or more computer programs can be configured to perform particular operations or actions by virtue of including instructions that, when executed by data processing apparatus, cause the apparatus to perform the actions.

A first aspect combinable with any of the general implementations further includes storing, at a memory location of the BHA, the relational information that relates the control input to the set of operating conditions; detecting an operating condition of the BHA; determining a candidate set of operating conditions including the detected operating condition; accessing the relational information from the memory location of the BHA; and determining, based on accessing the relational information, a control input to the BHA that is related to the candidate set of operating conditions including the detected operating condition.

In a second aspect combinable with any of the previous aspects, determining, based on accessing the relational information, a control input to the BHA is performed without performing computations to solve the objective function for a control input that satisfies the objective function.

In a third aspect combinable with any of the previous aspects, generating, at a secondary system, relational information that relates the control input to the set of operating conditions includes generating a relational database that relates the control input to the set of operating conditions.

In a fourth aspect combinable with any of the previous aspects, generating, at a secondary system, relational information that relates the control input to the set of operating conditions further includes determining a first control input to the BHA that satisfies the objective function for a first set of operating conditions of the BHA; determining a second control input to the BHA that satisfies the objective function for a second set of operating conditions of the BHA; determining that the first control input to the BHA and the second control input to the BHA are identical to each other; combining the first set of operating conditions and the second set of operating conditions into a combined set of operating conditions; and relating, in the relational information, the combined set of operating conditions to a single control input that corresponds to both the first and second control inputs.

A fifth aspect combinable with any of the previous aspects further includes detecting, at the secondary system and based on sensor measurements from the BHA, that a relational information update event has occurred; and updating the relational information at the BHA based on detecting that a relational information update event has occurred.

In a sixth aspect combinable with any of the previous aspects, updating the relational information at the BHA includes determining an updated model of BHA dynamics based on updated sensor measurements from the BHA; determining an updated objective function based on the updated model of BHA dynamics; determining an updated control input to the BHA that satisfies the updated objective function for the set of operating conditions of the BHA; generating, at the secondary system, updated relational information that relates the updated control input to the set of operating conditions; and transmitting the updated relational information from the secondary system to the BHA.

In a seventh aspect combinable with any of the previous aspects, transmitting the updated relational information from the secondary system to the BHA includes determining a difference between the updated relational information and the relational information; and transmitting the difference between the updated relational information and the relational information from the secondary system to the BHA.

In an eighth aspect combinable with any of the previous aspects, detecting that a relational information update event has occurred includes determining a threshold bound for a drilling parameter; and determining that at least one of a rate of change of the drilling parameter or an absolute value of the drilling parameter does not satisfy the threshold bound.

In a ninth aspect combinable with any of the previous aspects, determining a threshold bound further includes determining the threshold bound based on at least one of a desired control performance, a communication bandwidth between the secondary system and the BHA, or a processing capability of the secondary system.

A tenth aspect combinable with any of the previous aspects further includes implementing a constraint on the control input to the BHA while updating the relational information at the BHA.

In an eleventh aspect combinable with any of the previous aspects, transmitting the relational information from the secondary system to the BHA includes transmitting the relational information and the model of BHA dynamics from an above-surface location of the secondary system to the BHA.

In a twelfth aspect combinable with any of the previous aspects, transmitting the relational information from the secondary system to the BHA includes transmitting the relational information and the model of BHA dynamics from a below-surface location of the secondary system to the BHA.

In a thirteenth aspect combinable with any of the previous aspects, determining an objective function includes determining a weighting factor based on at least one of the model of BHA dynamics or the sensor measurements from the BHA; and determining a weighted combination of the predicted future deviation from the planned wellbore path and a predicted future cost of applying a control input to the BHA, weighted by the weighting factor.

In a fourteenth aspect combinable with any of the previous aspects, determining a control input to the BHA that satisfies the objective function for a set of operating conditions includes determining a control input to the BHA that minimizes a weighted combination of the predicted future deviation from the planned wellbore path and a predicted future cost of applying the control input to the BHA over a subsequent period of time during which the model of BHA dynamics satisfies the set of operating conditions.

In a fifteenth aspect combinable with any of the previous aspects, the predicted future cost of applying a control input to the BHA includes at least one of a predicted energy consumption for the BHA, a predicted torque on the BHA, a predicted fluid flow to the BHA, a predicted angular position of the BHA, or a predicted financial cost.

A sixteenth aspect combinable with any of the previous aspects further includes determining a candidate control input to the BHA; determining a predicted wellbore trajectory, based on the candidate control input to the BHA and the model of BHA dynamics; and determining the predicted future deviation from the planned wellbore path based on a deviation between the predicted wellbore trajectory and the planned wellbore path.

In a seventeenth aspect combinable with any of the previous aspects, determining a control input to the BHA includes determining at least one of a first bend angle control, a second bend angle control, a first packer control, or a second packer control.

Various implementations of a control system for wellbore drilling according to the present disclosure may include none, one or some of the following features. For example, the system may improve the efficiency and cost of drilling operations. In particular, techniques described herein may enable a low-latency, low-power and/or less computationally intensive downhole implementation of model-based predictive control by a BHA. In some examples, by shifting some of the computational burden of model-based predictive control to a secondary system, the BHA may be allowed to perform simpler operations, such as accessing data from a local database (e.g., performing lookups in a lookup table), which may be performed in less time and with fewer downhole resources.

In some examples, techniques described herein may be applied to directional drilling systems to enable reductions in downhole power and computing resources while satisfying a desired objective function. Relational information, such as a lookup table, stored in the BHA may provide a fast and efficient way to apply model-based predictive control inputs without necessarily performing computations to optimize the desired objective function.

A model of BHA dynamics may be used to generate predictions of future wellbore trajectory, and the secondary system may determine BHA control inputs that proactively adapt to predicted conditions in the wellbore. The model of BHA dynamics may be updated as new sensor measurements are received and as new control inputs are determined, and may enable close tracking of the true wellbore conditions. The secondary system may use these predictions, as well as planned wellbore path information and/or other information, to anticipate future changes in the wellbore and proactively adapt the control inputs in the relational information that is provided to the BHA.

The details of one or more implementations are set forth in the accompanying drawings and the description below. Other features, objects, and advantages will be apparent from the description and drawings, and from the claims.

FIG. 1 illustrates a portion of one implementation of a deviated wellbore system 100 according to the present disclosure. Although shown as a deviated system (e.g., with a directional, horizontal, or radiussed wellbore), the system can include a relatively vertical wellbore only (e.g., including normal drilling variations) as well as other types of wellbores (e.g., laterals, pattern wellbores, and otherwise). Moreover, although shown on a terranean surface, the system 100 may be located in a sub-sea or water-based environment. Generally, the deviated wellbore system 100 accesses one or more subterranean formations, and provides easier and more efficient production of hydrocarbons located in such subterranean formations. Further, the deviated wellbore system 100 may allow for easier and more efficient fracturing or stimulation operations. As illustrated in FIG. 1, the deviated wellbore system 100 includes a drilling assembly 104 deployed on a terranean surface 102. The drilling assembly 104 may be used to form a vertical wellbore portion 108 extending from the terranean surface 102 and through one or more geological formations in the Earth. One or more subterranean formations, such as productive formation 126, are located under the terranean surface 102. As will be explained in more detail below, one or more wellbore casings, such as a surface casing 112 and intermediate casing 114, may be installed in at least a portion of the vertical wellbore portion 108.

In some implementations, the drilling assembly 104 may be deployed on a body of water rather than the terranean surface 102. For instance, in some implementations, the terranean surface 102 may be an ocean, gulf, sea, or any other body of water under which hydrocarbon-bearing formations may be found. In short, reference to the terranean surface 102 includes both land and water surfaces and contemplates forming and/or developing one or more deviated wellbore systems 100 from either or both locations.

Generally, the drilling assembly 104 may be any appropriate assembly or drilling rig used to form wellbores or wellbores in the Earth. The drilling assembly 104 may use traditional techniques to form such wellbores, such as the vertical wellbore portion 108, or may use nontraditional or novel techniques. In some implementations, the drilling assembly 104 may use rotary drilling equipment to form such wellbores. Rotary drilling equipment is known and may consist of a drill string 106 and a bottom hole assembly (BHA) 118. In some implementations, the drilling assembly 104 may consist of a rotary drilling rig. Rotating equipment on such a rotary drilling rig may consist of components that serve to rotate a drill bit, which in turn forms a wellbore, such as the vertical wellbore portion 108, deeper and deeper into the ground. Rotating equipment consists of a number of components (not all shown here), which contribute to transferring power from a prime mover to the drill bit itself The prime mover supplies power to a rotary table, or top direct drive system, which in turn supplies rotational power to the drill string 106. The drill string 106 is typically attached to the drill bit within the bottom hole assembly 118. A swivel, which is attached to hoisting equipment, carries much, if not all of, the weight of the drill string 106, but may allow it to rotate freely.

The drill string 106 typically consists of sections of heavy steel pipe, which are threaded so that they can interlock together. Below the drill pipe are one or more drill collars, which are heavier, thicker, and stronger than the drill pipe. The threaded drill collars help to add weight to the drill string 106 above the drill bit to ensure that there is enough downward pressure on the drill bit to allow the bit to drill through the one or more geological formations. The number and nature of the drill collars on any particular rotary rig may be altered depending on the downhole conditions experienced while drilling.

The drill bit is typically located within or attached to the bottom hole assembly 118, which is located at a downhole end of the drill string 106. The drill bit is primarily responsible for making contact with the material (e.g., rock) within the one or more geological formations and drilling through such material. According to the present disclosure, a drill bit type may be chosen depending on the type of geological formation encountered while drilling. For example, different geological formations encountered during drilling may require the use of different drill bits to achieve maximum drilling efficiency. Drill bits may be changed because of such differences in the formations or because the drill bits experience wear. Although such detail is not critical to the present disclosure, there are generally four types of drill bits, each suited for particular conditions. The four most common types of drill bits consist of: delayed or dragged bits, steel to rotary bits, polycrystalline diamond compact bits, and diamond bits. Regardless of the particular drill bits selected, continuous removal of the "cuttings" is essential to rotary drilling.

The circulating system of a rotary drilling operation, such as the drilling assembly 104, may be an additional component of the drilling assembly 104. Generally, the circulating system has a number of main objectives, including cooling and lubricating the drill bit, removing the cuttings from the drill bit and the wellbore, and coating the walls of the wellbore with a mud type cake. The circulating system consists of drilling fluid, which is circulated down through the wellbore throughout the drilling process. Typically, the components of the circulating system include drilling fluid pumps, compressors, related plumbing fixtures, and specialty injectors for the addition of additives to the drilling fluid. In some implementations, such as, for example, during a horizontal or directional drilling process, downhole motors may be used in conjunction with or in the bottom hole assembly 118. Such a downhole motor may be a mud motor with a turbine arrangement, or a progressive cavity arrangement, such as a Moineau motor. These motors receive the drilling fluid through the drill string 106 and rotate to drive the drill bit or change directions in the drilling operation.

In many rotary drilling operations, the drilling fluid is pumped down the drill string 106 and out through ports or jets in the drill bit. The fluid then flows up toward the surface 102 within an annular space (e.g., an annulus) between the wellbore portion 108 and the drill string 106, carrying cuttings in suspension to the surface. The drilling fluid, much like the drill bit, may be chosen depending on the type of geological conditions found under subterranean surface 102. For example, certain geological conditions found and some subterranean formations may require that a liquid, such as water, be used as the drilling fluid. In such situations, in excess of 100,000 gallons of water may be required to complete a drilling operation. If water by itself is not suitable to carry the drill cuttings out of the bore hole or is not of sufficient density to control the pressures in the well, clay additives (bentonite) or polymer-based additives, may be added to the water to form drilling fluid (e.g., drilling mud). As noted above, there may be concerns regarding the use of such additives in underground formations which may be adjacent to or near subterranean formations holding fresh water.

In some implementations, the drilling assembly 104 and the bottom hole assembly 118 may operate with air or foam as the drilling fluid. For instance, in an air rotary drilling process, compressed air lifts the cuttings generated by the drill bit vertically upward through the annulus to the terranean surface 102. Large compressors may provide air that is then forced down the drill string 106 and eventually escapes through the small ports or jets in the drill bit. Cuttings removed to the terranean surface 102 are then collected.

As noted above, the choice of drilling fluid may depend on the type of geological formations encountered during the drilling operations. Further, this decision may be impacted by the type of drilling, such as vertical drilling, horizontal drilling, or directional drilling. In some cases, for example, certain geological formations may be more amenable to air drilling when drilled vertically as compared to drilled directionally or horizontally.

As illustrated in FIG. 1, the bottom hole assembly 118, including the drill bit, drills or creates the vertical wellbore portion 108, which extends from the terranean surface 102 towards the target subterranean formation 124 and the productive formation 126. In some implementations, the target subterranean formation 124 may be a geological formation amenable to air drilling. In addition, in some implementations, the productive formation 126 may be a geological formation that is less amenable to air drilling processes. As illustrated in FIG. 1, the productive formation 126 is directly adjacent to and under the target formation 124. Alternatively, in some implementations, there may be one or more intermediate subterranean formations (e.g., different rock or mineral formations) between the target subterranean formation 124 and the productive formation 126.

In some implementations of the deviated wellbore system 100, the vertical wellbore portion 108 may be cased with one or more casings. As illustrated, the vertical wellbore portion 108 includes a conductor casing 110, which extends from the terranean surface 102 shortly into the Earth. A portion of the vertical wellbore portion 108 enclosed by the conductor casing 110 may be a large diameter wellbore. For instance, this portion of the vertical wellbore portion 108 may be a 17½" wellbore with a 13⅜" conductor casing 110. Additionally, in some implementations, the vertical wellbore portion 108 may be offset from vertical (e.g., a slant wellbore). Even further, in some implementations, the vertical wellbore portion 108 may be a stepped wellbore, such that a portion is drilled vertically downward and then curved to a substantially horizontal wellbore portion. The substantially horizontal wellbore portion may then be turned downward to a second substantially vertical portion, which is then turned to a second substantially horizontal wellbore portion. Additional substantially vertical and horizontal wellbore portions may be added according to, for example, the type of terranean surface 102, the depth of one or more target subterranean formations, the depth of one or more productive subterranean formations, and/or other criteria.

Downhole of the conductor casing 110 may be the surface casing 112. The surface casing 112 may enclose a slightly smaller wellbore and protect the vertical wellbore portion 108 from intrusion of, for example, freshwater aquifers located near the terranean surface 102. The vertical wellbore portion 108 may than extend vertically downward toward a kickoff point 120, which may be between 500 and 1,000 feet above the target subterranean formation 124. This portion of the vertical wellbore portion 108 may be enclosed by the intermediate casing 114. The diameter of the vertical wellbore portion 108 at any point within its length, as well as the casing size of any of the aforementioned casings, may be an appropriate size depending on the drilling process.

Upon reaching the kickoff point 120, drilling tools such as logging and measurement equipment may be deployed into the wellbore portion 108. At that point, a determination of the exact location of the bottom hole assembly 118 may be made and transmitted to the terranean surface 102. Further, upon reaching the kickoff point 120, the bottom hole assembly 118 may be changed or adjusted such that appropriate directional drilling tools may be inserted into the vertical wellbore portion 108.

As illustrated in FIG. 1, a curved wellbore portion 128 and a horizontal wellbore portion 130 have been formed within one or more geological formations. Typically, the curved wellbore portion 128 may be drilled starting from the downhole end of the vertical wellbore portion 108 and deviated from the vertical wellbore portion 108 toward a predetermined azimuth gaining from between 9 and 18 degrees of angle per 100 feet drilled. Alternatively, different predetermined azimuth may be used to drill the curved wellbore portion 128. In drilling the curved wellbore portion 128, the bottom hole assembly 118 often uses measurement-while-drilling ("MWD") equipment to more precisely determine the location of the drill bit within the one or more geological formations, such as the target subterranean formation 124. Generally, MWD equipment may be utilized to directionally steer the drill bit as it forms the curved wellbore portion 128, as well as the horizontal wellbore portion 130.

Alternatively to or in addition to MWD data being compiled during drilling of the wellbore portions shown in FIG. 1, certain high-fidelity measurements (e.g., surveys) may be taken during the drilling of the wellbore portions. For example, surveys may be taken periodically in time (e.g., at particular time durations of drilling, periodically in wellbore length (e.g., at particular distances drilled, such as every 30 feet or otherwise), or as needed or desired (e.g., when there is a concern about the path of the wellbore). Typically, during a survey, a completed measurement of the inclination and azimuth of a location in a well (typically the total depth at the time of measurement) is made in order to know, with reasonable accuracy, that a correct or particular wellbore path is being followed (e.g., according to a wellbore plan). Further, position may be helpful to know in case a relief well must be drilled. High-fidelity measurements may include inclination from vertical and the azimuth (or compass heading) of the wellbore if the direction of the path is critical. These high-fidelity measurements may be made at discrete points in the well, and the approximate path of the wellbore computed from the discrete points. The high-fidelity measurements may be made with any suitable high-fidelity sensor. Examples include, for instance, simple pendulum-like devices to complex electronic accelerometers and gyroscopes. For example, in simple pendulum measurements, the position of a freely hanging pendulum relative to a measurement grid (attached to the housing of a measurement tool and assumed to represent the path of the wellbore) is captured on photographic film. The film is developed and examined when the tool is removed from the wellbore, either on wireline or the next time pipe is tripped out of the hole.

The horizontal wellbore portion 130 may typically extend for hundreds, if not thousands, of feet within the target subterranean formation 124. Although FIG. 1 illustrates the horizontal wellbore portion 130 as exactly perpendicular to the vertical wellbore portion 108, it is understood that directionally drilled wellbores, such as the horizontal wellbore portion 130, have some variation in their paths. Thus, the horizontal wellbore portion 130 may include a "zigzag" path yet remain in the target subterranean formation 124. Typically, the horizontal wellbore portion 130 is drilled to a predetermined end point 122, which, as noted above, may be up to thousands of feet from the kickoff point 120. As noted above, in some implementations, the curved wellbore portion 128 and the horizontal wellbore portion 130 may be formed utilizing an air drilling process that uses air or foam as the drilling fluid.

The wellbore system 100 also includes a controller 132 that is communicative with the BHA 118. The controller 132 may be located at the wellsite (e.g., at or near drilling assembly 104, either above-surface or underground) or may be remote from the wellsite (e.g., at a remote location and communicative with components of the wellsite using one or more communication mechanisms). The controller 132 may also be communicative with other systems, devices, databases, and networks. Generally, the controller 132 may include a processor based computer or computers (e.g., desktop, laptop, server, mobile device, cell phone, or otherwise) that includes memory (e.g., magnetic, optical, RAM/ROM, removable, remote or local), a network interface (e.g., software/hardware based interface), and one or more input/output peripherals (e.g., display devices, keyboard, mouse, touchscreen, and others).

The controller 132 may at least partially control, manage, and execute operations associated with the drilling operation of the BHA. In some aspects, the controller 132 may control and adjust one or more of the illustrated components of wellbore system 100 dynamically, such as, in real-time during drilling operations at the wellbore system 100. The real-time control may be adjusted based on sensor measurement data or based on changing predictions of the wellbore trajectory, even without any sensor measurements.

The controller 132 may perform such control operations based on a model of BHA dynamics. The model of BHA dynamics may simulate various physical phenomena in the drilling operation, such as vibrational disturbances and sensor noise. The controller 132 may use the model of BHA dynamics to determine relational information that relates BHA control inputs to different sets of operating conditions for which the BHA control inputs satisfy an objective function, and to periodically transmit and/or update the relational information to the BHA, based on changing downhole conditions.

In general, a model of BHA dynamics may rely on an underlying state variable that evolves with time, representing changing conditions in the drilling operation. The state variable in the model of BHA dynamics may be an estimate of the true state of the BHA, from which estimates of wellbore trajectory can be derived. The time evolution of the BHA dynamics may be represented by a discrete-time state-space model, an example of which may be formulated as:

$$x(k+1) = Ax(k) + Bu(k) + w(k)$$

$$y(k) = Cx(k) + v(k) \qquad (1)$$

where the matrices A, B, and C are system matrices that represent the underlying dynamics of BHA drilling and measurement. The system matrices A, B, and C are determined by the underlying physics and mechanisms employed in the drilling process. In practice, these matrices are estimated and modeled based on experience. The state x(k) is a vector that represents successive states of the BHA system, the input u(k) is a vector that represents BHA control inputs, and the output y(k) is a vector that represents the observed (measured) trajectory of wellbore.

In some aspects, the vector w(k) represents process noise and the vector, v(k), represents measurement noise. The process noise w accounts for factors such as the effects of rock-bit interactions and vibrations, while the measurement noise v accounts for noise in the measurement sensors. The noise processes w(k) and v(k) may not be exactly known, although reasonable guesses can be made for these processes, and these guesses can be modified based on experience. The noise vectors w(k) and v(k) are typically modeled by Gaussian processes, but non-Gaussian noise can also be modeled by modifying the state x and matrix A to include not only the dynamics described by the states variables, but also the dynamics of stochastic noise, as described further below.

In the examples discussed below, the BHA control input vector u(k) includes 6 control variables, representing first and second bend angles of the BHA, a depth of the BHA, activation of first and second packers (e.g., by inflation of the packers, mechanical compression of the packers, etc.), and a separation of the packers. The output vector y(k) includes 12 observed measurement values, including 6 measurement values from a near inclinometer and magnetometer package and another 6 measurements from a far inclinometer and magnetometer package (hereinafter, "inc/mag"). The state vector x(k) is a vector of dimension $12+n_d$, which includes 12 states that represent the actual azimuth and inclination values, as would be observed (measured) by the near and far inc/mag packages. The value $n_d$ is the order of a disturbance model which filters the un-modeled disturbances, and adds to the 12 states representing the system dynamics.

The state transition matrix A is therefore, in this example, a $(12+n_d)$ by $(12+n_d)$ dimensional state transition matrix that represents the underlying physics, the matrix B is a $(12+n_d)$ by 6 dimensional matrix that governs the relation between the control variables and the state of the system, and the matrix C is a 12 by (12+$n_d$) matrix that governs the relation between the observations, y, and the state of the system, x. The matrices A, B, and C may be determined using any suitable estimation or modeling technique, such as a lumped-mass system model. There can be more states if a more complex dynamic model is used to describe the system.

Due to the random noise and potential inaccuracies in modeling the system matrices A, B, and C, the state x of the model of BHA dynamics in Equation 1 is, in general, not exactly known, but rather inferred. In these scenarios, Equation 1 may be used to determine inferences, or estimates, of the state x and measurements y, rather than their true values. In particular, the model of Equation 1 may be used to generate predictions of future values of state x and observations y. Such predictions may take into account actual measurements to refine the model dynamics in Equation 1.

For example, the following equation may be used to obtain an estimate $\hat{x}$ of the next state of the BHA system, in the absence of any current measurements:

$$\hat{x}(k+1)=A\hat{x}(k)+Bu(k)$$

$$\hat{y}(k)=C\hat{x}(k) \quad (2)$$

If current measurements y are available, then predictions may be generated by using Kalman filtering update equations:

$$\hat{x}(k+1)=A\hat{x}(k)+Bu(k)+K[y(k)-\hat{y}(k)]$$

$$\hat{y}(k)=C\hat{x}(k) \quad (3)$$

In Equation 3, y(k) represents the actual observation (e.g., provided by high-fidelity sensor measurements, MWD sensor measurements, or any other suitable sensor measurements). The factor K (e.g., a time-varying factor), also known as the Kalman observation gain, represents a correction factor to account for the error between the actual trajectory and the estimated trajectory, y(k)−ŷ(k). In general, a larger value of K implies that more weight is given to the measured observation y(k) in determining the estimate of the next state $\hat{x}(k+1)$. Typically, K depends on the amount of vibration and reaction force that is affecting the drill bit. The value of K may be chosen according to any suitable criterion (e.g., minimize mean-squared error of state estimate, or any other suitable criterion), to achieve a desired tradeoff between relative importance of measured observations and underlying model dynamics.

The model of BHA dynamics in Equation 1 may be updated dynamically as new information is received by the controller (e.g., the controller 132 in FIG. 1). For example, matrices A and B may be affected by known control inputs (e.g., BHA control, trajectory, etc.) in addition to being affected by any measurements (e.g., logging measurements, high-fidelity measurements, etc.). Therefore, the model of BHA dynamics may be updated as the control inputs and/or drilling environment change.

A model-based predictive controller may use the model of BHA dynamics in Equation 1 to generate predictions of future wellbore trajectory, and based on these predictions, determine BHA input controls that satisfy a desired objective function. The objective function may be a combination of one or more objectives, weighted by weighting factors. As examples, the objectives may relate to reducing deviation from a planned wellbore path, reducing input energy consumption for the BHA, reducing torque on the BHA, or any other suitable objective related to the drilling operation.

As an illustrative example, the objective function may minimize, over a future horizon of time, a weighted combination of two objectives: (1) a deviation from a planned wellbore path, and (2) a future cost of applying a control input to the BHA, subject to a set of constraints. The future cost of applying a control input may relate to, as examples, input energy consumption for the BHA, torque on the BHA, fluid flow to the BHA, angular position of the BHA, financial cost associated with drilling (e.g., a financial cost per distance or per time) or any other suitable cost parameter related to the drilling operation. An example objective function is shown below:

$$\min_u \sum_{k=t}^{t+T} \left[(y(k)-y^{sp})^T Q(k)(y(k)-y^{sp}) + \Delta u(k)^T S(k)\Delta u(k)\right]$$

$$\text{subject to } \begin{cases} y(k) = G(k)u(k) \\ u^{min} \le u(k) \le u^{max} \\ y^{min} \le y(k) \le y^{max} \end{cases}$$

If converted to the state-space formulation, the objective function becomes:

$$\min_u \sum_{k=t}^{t+T} \left[(x(k)-x^{sp})^T C^T Q(k)C(x(k)-x^{sp}) + \Delta u(k)^T S(k)\Delta u(k)\right] \quad (4)$$

$$\text{subject to } \begin{cases} x(k+1) = Ax(k) + BU(k) \\ y(k) = Cx(k) \\ u^{min} \le u(k) \le u^{max} \\ y^{min} \le y(k) \le y^{max} \end{cases} \quad (5)$$

where $y^{sp}$ is the planned wellbore path (and $x^{sp}$ the corresponding sequence of states), t denotes the current time instant, and T is the prediction horizon (which may be finite to obtain a dynamic solution, or may be infinite to obtain a steady-state solution). The first term in the objective function in Equation 4 is a quadratic term that corresponds to the objective of minimizing a squared deviation from the planned wellbore path, weighted by a weighting matrix Q(k) (which may be time-varying). The second term in Equation 5 is a quadratic term that corresponds to an objective of minimizing a squared change in the input controls, which represents input energy consumption, weighted by a weighting matrix S(k) (which may be time-varying). In the second term, it is assumed that the downhole power consumption is proportional to change rates of input controls (e.g., bend angles and activation of packers). The change in input controls is the difference between the input controls in successive time steps, Δu(k)=u(k)−u(k−1). The function G(•) is an input-output representation based on the model of BHA dynamics in Equation 1. In particular, the function G(•) may use either Equation 2 (e.g., for updates without measurements) or Equation 3 (e.g., for updates with measurements) to yield next-step predictions of the measurement y based on a desired BHA input control u. An example of a state-space based input-output formulation is given in Equation 4.

There may be one or more constraints on the input ($u^{min}$ and/or $u^{max}$) and/or the output ($y^{min}$ and/or $y^{max}$), and/or any suitable combination of input constraints and output constraints, of the objective function, as shown in Equation 5. Such constraints may represent real-life drilling constraints, such as maximum bend angles, minimum fluid flow, maximum rate of penetration, etc. One or more or none of the constraints in Equation 5 may be considered in the solution of the objective function in Equation 4.

In the current time step t, after solving the objective function in Equation 4 to generate a desired control signal sequence u(k), k=t, t+1, . . . , (t−T), only the first control signal u(t) is applied to the BHA. At the next time instant t+1, the objective function in Equation 4 is solved again to generate the next sequence of controls, u(k), k=t+1, . . . , (t+1+T), of which the first control u(t+1) is applied to the BHA. These iterations continue, looking ahead T steps into the future to yield the best current-step control u that should be applied to the BHA to satisfy the objective function in Equation 4.

As a downhole BHA control technique, the computations to generate control inputs u(k) that satisfy the objective function in Equation 4 can require a significant amount of resources. If the downhole resources are limited (e.g., in terms of processing speed, power supply, etc.) and the BHA operates in high-temperature-high-pressure drilling environments, then a large capital cost may be expended to implement a model-based predictive control as described above. Exacerbating this problem, in some examples, fast dynamics of BHA operations can result in control algorithm sampling rates of at least 1 Hz for tool face control and 10 Hz for vibration control. In many scenarios, a fast processor is typically used to compute BHA control inputs for a model-based predictive control (e.g., as a solution to Equation 4). This can impose significant burdens on the downhole computing equipment.

In some examples, the computational burden of solving the objective function in Equation 4 (and, in same examples, the constraints in Equation 5) may be performed, in part or in whole, by a secondary system apart from the BHA. For example, the secondary system may be the controller 132 in FIG. 1, or may be any suitable system (above or below the surface) that is local or remote to the wellsite.

The secondary system may pre-compute control inputs that satisfy an objective function, generate relational information (e.g., a lookup table) that provides the control inputs in a more easily-accessible manner, and provide the relational information to the BHA. Such techniques may enable a more affordable and feasible solution to implement MPC to control downhole BHA that may have limited resources.

In general, any suitable objective function, not necessarily quadratic as in Equation 4, may be used to control the BHA. However, in some examples, a quadratic cost may be a good model of actual costs that are considered by upper layer controllers or optimizers in managing the drilling operations. Also, the set of constraints need not necessarily be convex, as in Equation 5. However, in some examples, convex constraints may be desirable. In particular, models of BHA dynamics that are used by model-predictive control are typically based on linearization of a first-principle BHA model. The physical constraints that are applied to the BHA are typically derived from various mechanical properties of the BHA and rock formation properties, which are also typically linearized. These various constraints, including both model constraints and physical constraints, may be well-modeled by convex constraints (e.g., as in Equation 5).

In the case of quadratic objective functions and convex constraint sets (e.g., in Equations 4 and 5), the control input that satisfies the objective function has a linear form. Therefore, in the example above, the secondary system may solve the objective function and constraints to generate control inputs that have the form:

$$u(k)=Fx(k)+u_0 \quad (6)$$

where $u_0$ is an offset vector term and F represents a feedback term, which depends on the operating point in which the system state x(k) exists. The BHA control input in Equation 6 is a piecewise linear function, such that over a particular range of values of state x(k) (representing a particular set of operating conditions for the BHA), Equation 6 is a linear function with constant slope matrix F. The slope matrix F may change to another constant value in a different range of values for state x(k) representing another set of operating conditions. In this example, the slope matrix F uniquely defines the relationship between the state x and the control u (assuming a known offset $u_0$). If a secondary system solves the constrained objective function in Equations 4 and 5 to obtain the values of slope matrix F corresponding to different regions of x, then it may simply provide the BHA with the values of matrix F, from which the BHA may determine the control input u by the multiplicative operation in Equation 6 (e.g., by using one or more processors within the BHA to perform the multiplicative calculations).

If the state-space realization of the model is properly chosen, the system state x(k) can represent a physical drilling parameter, for example, a rate of penetration (ROP), a radius of curvature, etc. In such scenarios, the control law in Equation 6 enables the BHA control decision u(k) to be based on an operating condition of the drilling, via the value of state x(k). Also, in the example of quadratic-cost and convex-constraints in Equations 4 and 5, a set of operating conditions for the BHA can be determined that correspond to each constant value of input control gain matrix F. Therefore, if the BHA determines that a system state x belongs to a particular set of operating conditions, then it may easily determine the control input u(k) by determining the slope matrix F that corresponds to the set of operating conditions (e.g., via a lookup table) and multiplying the matrix F and the system state x.

In the quadratic-cost-convex-constraint example above, each set of operating conditions corresponds to an "active" constraint set of Equation 5 (e.g., the input u equal to one of the bounds $u^{min}$ or $u^{max}$ or the output y equal to one of the output bounds $y^{min}$ or $y^{max}$). The secondary system may precompute BHA control inputs (e.g., using the linear control law in Equation 6) in advance by considering each constraint (e.g., in Equation 5) and solving for the control input that satisfies that constraint. The relational information (e.g., look-up table or other input-output function) for the control input is then generated by gathering the states that correspond to the active constraint, and the control law for that constraint. In some examples, this may be repeated for all the other constraints in Equation 5 to generate, for all possible states, control inputs that satisfy the objective function in Equation 4 and the constraints in Equation 5.

The relational information may then be transmitted from the secondary system to the BHA. In some examples, the model of BHA dynamics may also be transmitted the BHA. Such information may be transmitted using any suitable communication technique via a suitable number of communication modules communicating over a communication medium (e.g., wired or wireless). In some examples, the communication techniques may include various forms of data processing such data compression, channel coding, filtering, and/or other suitable data processing techniques. Upon receiving the relational information, and in some examples, receiving the model of BHA dynamics, the BHA may store the information in local memory. Intuitively, each entry in the relational information corresponds to a particular operating condition during drilling. The BHA can detect an operating condition in the wellbore and determine an appropriate control input by accessing the lookup table. The BHA may detect a past or current operating condition (e.g., based on sensor measurements) or may detect a predicted operating condition (e.g., based on wellbore planning information or model-based predictions).

For example, if wellbore planning information or a model-based prediction indicates a sharp turn ahead in the wellbore trajectory, then a constraint on maximum bend angle may be active, in order to satisfy the objective function in Equation 4. That is, the bend angle may be maintained at its maximum value over the entire planning or prediction horizon. This information may be gleaned by the BHA by simply accessing the relational information to determine the input control corresponds to the detected operating condition (e.g., by determining a gain matrix F and applying the gain F in the control law in Equation 6). This lookup operation may, in the example of Equations 4 and 5, have the same effect as if an MPC optimization problem were solved to obtain the control input that satisfies the objective function for the detected operating condition. This may enable more efficient drilling operating by reducing computation time and power in the BHA. In some examples, the relational information may be stored locally at the BHA, or if cost of storage is restrictive, the relational information may be stored apart from the BHA and accessed by the BHA.

Figure 2:
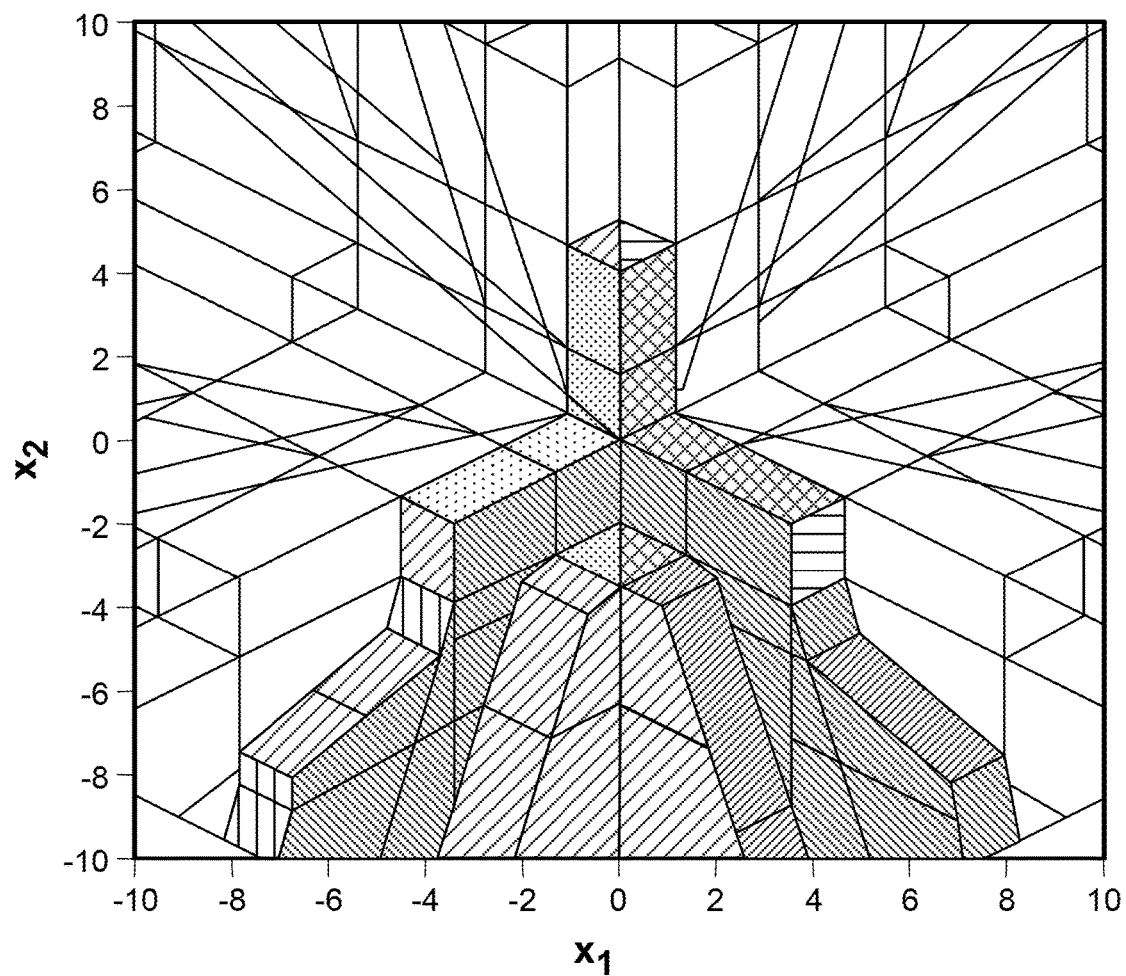
FIG. 2 illustrates an example three-dimensional state space representation of a piecewise-linear control law.

FIG. 2 illustrates an example 3-dimensional state space representation of a piecewise-linear control law. In this example, there are two states, $x_1$ and $x_2$, and 252 sets of operating conditions, or regions, in the state space. Each region is represented by a 3-dimensional hyperplane with constant slope, and the values along each hyperplane represent the control input corresponding to different values of state ($x_1$, $x_2$). The number of regions in the state space may depend on several factors. For example, one factor that affects the number of sets of operating conditions is the number of states. A larger number of states typically results in more regions, because each state may have its own constraints according to the model (e.g., the model in Equations 1-5). Fortunately, a typical BHA model includes 4 inputs and 12 outputs with relatively simple dynamics. The number of states is also typically limited, for example it may be $12+n_d$ where $n_d$ depends on the complexity of the disturbance model. Another factor that determines the number of sets of operating conditions is the number of physical constraints (e.g., inequality constraints in Equation 5). More physical constraints tend to create more regions in the state space. The impact of the number of physical constraints is typically exponential in the resulting number of regions. For example, a constraint of maximum bend angle, $\theta \le \theta_{max}$, results in two regions, corresponding to an active constraint, $\theta = \theta_{max}$, or an inactive constraint $\theta < \theta_{max}$. This example partitions the feasible region of states (or 4 inputs, due to the dynamics) into two halves. In some examples, for a BHA MPC problem, the physical constraints are primarily imposed by mechanical properties. Another factor that impacts the number of regions in the state space is the prediction horizon of the MPC. A longer prediction horizon creates more control variables u(k),u(k+1), . . . to solve for, and therefore a more complex state space in which a solution to the objective function is to be found, resulting in a larger number of regions generated by constraints. In particular, this factor may contribute more significantly to the complexity of the lookup table in the scenario of fast dynamics of the BHA.

Figure 3:
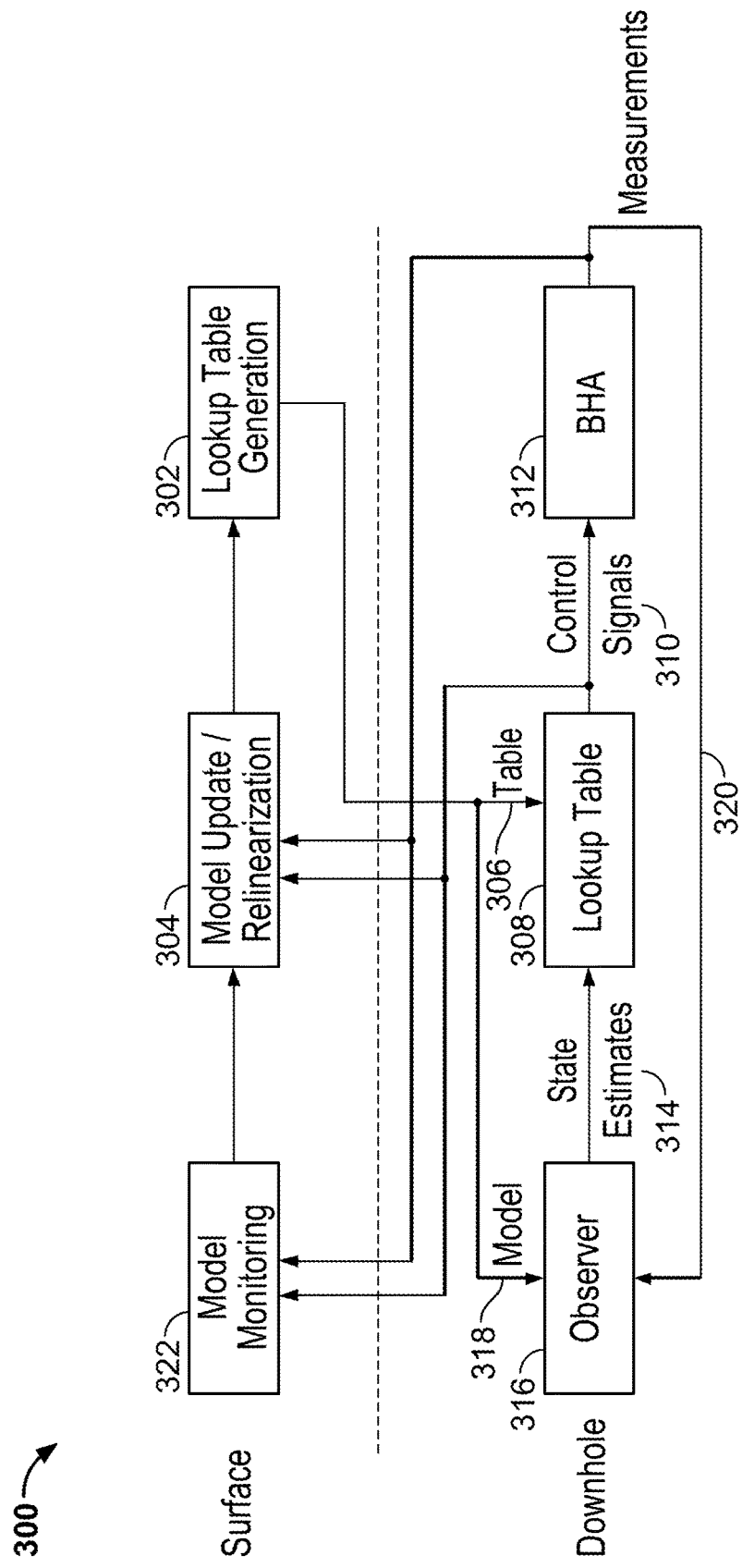
FIG. 3 illustrates a flow diagram of an example of a process of implementing a MPC technique by generating and providing relational information to a downhole BHA control.

FIG. 3 illustrates a flow diagram of an example of a process of implementing a MPC technique by generating and providing relational information to a downhole BHA control. In this example, the secondary system (e.g., controller 132 in FIG. 1) is above-surface, but may generally be located at any suitable location, such as below the surface. In the example of FIG. 3, relational information, such as a lookup table, is generated by lookup table generation module 302. The generation of the lookup table may depend on a model of BHA dynamics provided by model update module 304. The lookup table generation module 302 may calculate different possibilities of active constraint sets. Then, the lookup table generation module 302 may translate each region to quantitative equalities/inequalities for the state x. The lookup table generation module 302 may then compute a control input (e.g., using the control law in Equation 6) within each region, including a feedback gain F and an offset $u_0$, to generate a lookup table 306. The lookup table generation module 302 may then provide the lookup table 306 to a lookup table module 308 in the BHA, which may store the lookup table 306 in a local memory store. In some examples, the model associated with the lookup table may also be passed downhole to the BHA.

During drilling operations, the lookup table module 308 may access the stored lookup table to determine BHA control inputs 310 based on detected operating conditions in the wellbore, and provide the BHA control inputs 310 to the BHA 312. The operating conditions in the wellbore may be determined based on state estimates 314 received from an observer module 316. The observer module 316 may determine the state estimates 314 based on a model of BHA dynamics 318 provided by the lookup table generation module 302 at the secondary system. In this example, the observer module 316 also uses sensor measurements 320 to determine the state estimates 314 used by the lookup module 308. As a specific example, the observer module 316 may use a Kalman filtering formulation (e.g., as in Equation 3) to determine an estimate $\hat{x}(k+1)$ of the true state x(k+1) based on observations and applied controls, since the true state may not be exactly known due to noise in the downhole environment.

During drilling operations, a model monitoring module 322 in the secondary system may monitor sensor measurements 320 and the control signals 310 to determine whether the model of BHA dynamics 318 accurately tracks the true wellbore conditions. This may be determined by monitoring for a relational information update event, and updating the relational information at the BHA based on detecting that a relational information update event has occurred. If the model monitoring module 322 determines that a relational information update event has occurred, and that the model of BHA dynamics 318 has significantly diverged from the actual wellbore conditions (e.g., as measured by the sensors), then the model update module 304 may generate an updated model of BHA dynamics, based on tracking information provided by the model monitoring module 322. During this model update, the control input to the BHA may be restrained or adapted to be less aggressive.

The relational information update event may be configured to be any suitable event that represents a divergence between the model of BHA dynamics and the true conditions in the wellbore. As an example, the model monitoring module 322 may determine residual values $r_{model}$ of the model based on sensor measurements and/or predictions, and compare the residual values against a design residual value $r_{design}$. The design residual value $r_{design}$ may be determined during an initial design of the model or at a time of a model update. The residual value $r_{model}$ may be based on a model of change of a model parameter (e.g., a rate of change, an integral of a drilling parameter, a functional transform of a drilling parameter, etc.), or additionally or alternatively, may be determined based on an absolute value, or other suitable characteristic, of a model parameter, or may be directly determined based on measured output observations (e.g., a difference or other deviation between measured and estimated outputs, such as $y(k)-\hat{y}(k)$ in Equation 3). If the residual values diverge from the design residual values by a significant amount, then the model monitoring module 322 may determine that a relational information update event has occurred and the model should be updated. In some examples, the model monitoring module 322 may compute a ratio $\eta$ of aggregate residual values to the design residual values, over a suitable horizon of time:

$$\eta = \frac{\Sigma res^2}{\Sigma res_{design}^2} \quad (7)$$

If the ratio $\eta$ exceeds some threshold bound, such as an upper limit $\eta_{max}$, then it may be considered that the model of BHA dynamics has dramatically diverged from true wellbore conditions. The limit $\eta_{max}$ may be determined by considering one or more drilling parameters, such as the desired control performance, the bandwidth of downlink, the computing power in the secondary system, etc. A smaller value of the threshold bound $\eta_{max}$ usually leads to more frequent update of the model, while a larger value of the threshold bound $\eta_{max}$ results in a coarser control that may reduce control performance. After model update by the model update module 304, the procedure of computation and generation of an updated lookup table is performed again by the lookup table generation module 302, and the updated lookup table, along with the updated model, is re-sent to the downhole BHA.

Figures 4A, 4B:
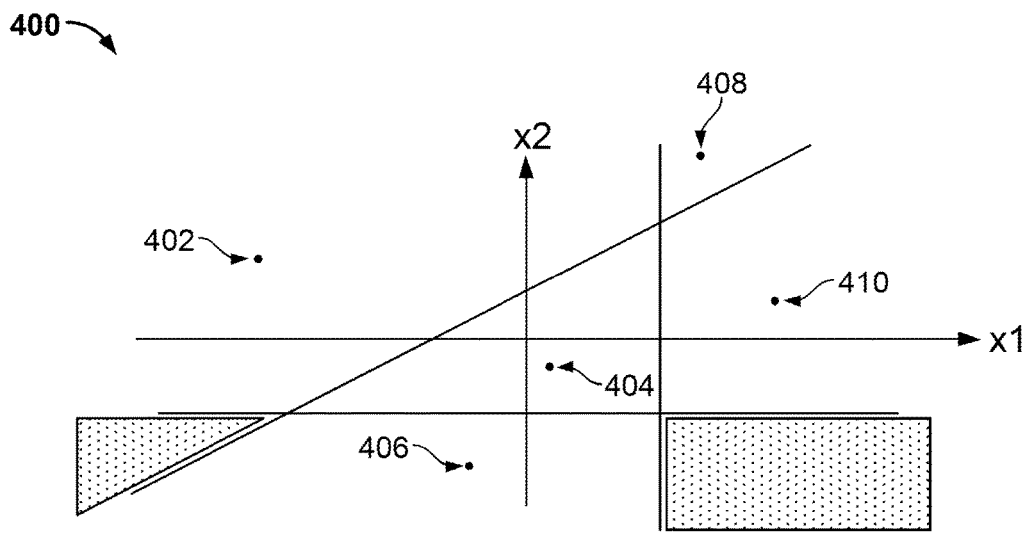
FIGS. 4A and 4B illustrate examples of determining different sets of operating conditions that are used to generate relational information provided to a BHA.

FIGS. 4A and 4B illustrate examples of determining different sets of operating conditions that are used to generate relational information (e.g., lookup table 306 in FIG. 3) provided to a BHA to implement MPC control. In these examples, there are two states, $x_1$ and $x_2$. FIG. 4A is a sketch of an example of a state space that includes different sets of operating conditions, represented by partitioned regions. In this example, the state space 400 is partitioned into five different regions, 402, 404, 406, 408, and 410. Each region corresponds to a particular set of operating conditions (shown in the lookup table 412 in FIG. 4B) for which a fixed BHA control input satisfies an objective function and input/output constraints (e.g., as in Equations 4 and 5).

For example, region 402 corresponds to the set of operating conditions defined by states $x_1$ and $x_2$ in the region $x_1 \leq 1$, $x_2 \geq -1$, $x_2 - x_1 \geq 1$. For all states (operating conditions) in this region, the BHA control input that satisfies a given objective function and constraints (e.g., given by Equations 4 and 5) is $u = x_1 - x_2$. In terms of the control law formulation of Equation 6, the BHA control input u corresponds to slope matrix $F = [1 \ -1]$ and offset $u_0 = 0$. Therefore, in the lookup table provided to the BHA, the entry for region 402 may indicate either the control input $u = x_1 - x_2$, or may indicate just the slope matrix F and the offset $u_0$ (or any other suitable representation of the control input u).

In some examples, an extra step of combining different entries having the same control inputs may be performed, as illustrated by the 4th and 5th entries in the lookup table 412 of FIG. 4B, corresponding to regions 408 and 410 in FIG. 4A. For example, the secondary system may determine that the control input for region 408, $u = 2x_1 - x_2 - 1$ is identical to the control input for region 410. In such scenarios, the set of operating conditions corresponding to region 408 may be joined with the set of operating conditions corresponding to region 410 to yield a single combined set of operating conditions. The relational information (e.g., the lookup table 412 in FIG. 4B) may then relate the combined set of operating conditions to a single control input (e.g., $u = 2x_1 - x_2 - 1$ in this example) that satisfies the objective function for those operating conditions. In some examples, this may enable a more compact representation of the relational information, and thus reduce storage requirements in the BHA for storing the relational information.

Figure 5:
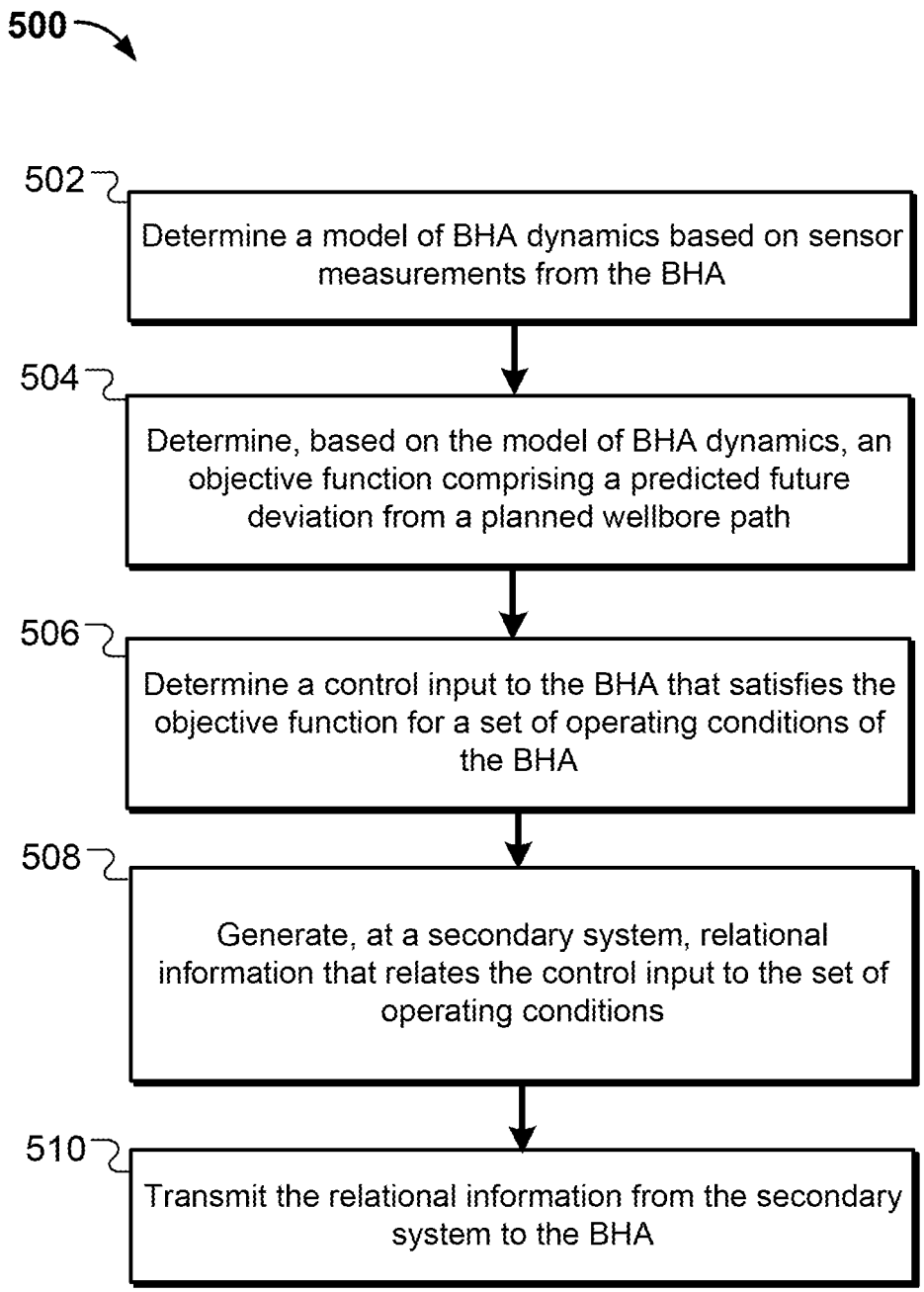
FIG. 5 is a flow chart of an example process for generating and providing relational information to a BHA for performing model-based predictive control.

FIG. 5 is a flow chart of an example process 500 for generating and providing relational information to a BHA for performing model-based predictive control. One or more steps of the example process 500 of FIG. 5 may be performed by a secondary system (e.g., controller 132 in FIG. 1). In this example, the controller determines a model of BHA dynamics (e.g., the model in Equations 1-3) based on sensor measurements from the BHA (502). The controller then determines, based on the model of BHA dynamics, an objective function including a predicted future deviation from a planned wellbore path (504). The controller determines a control input to the BHA that satisfies the objective function for a set of operating conditions of the BHA (506). The controller then generates relational information (e.g., the lookup table 412 in FIG. 4B) that relates the control input to the set of operating conditions (508). The controller then transmits the relational information from the secondary system to the BHA (510).

Figure 6:
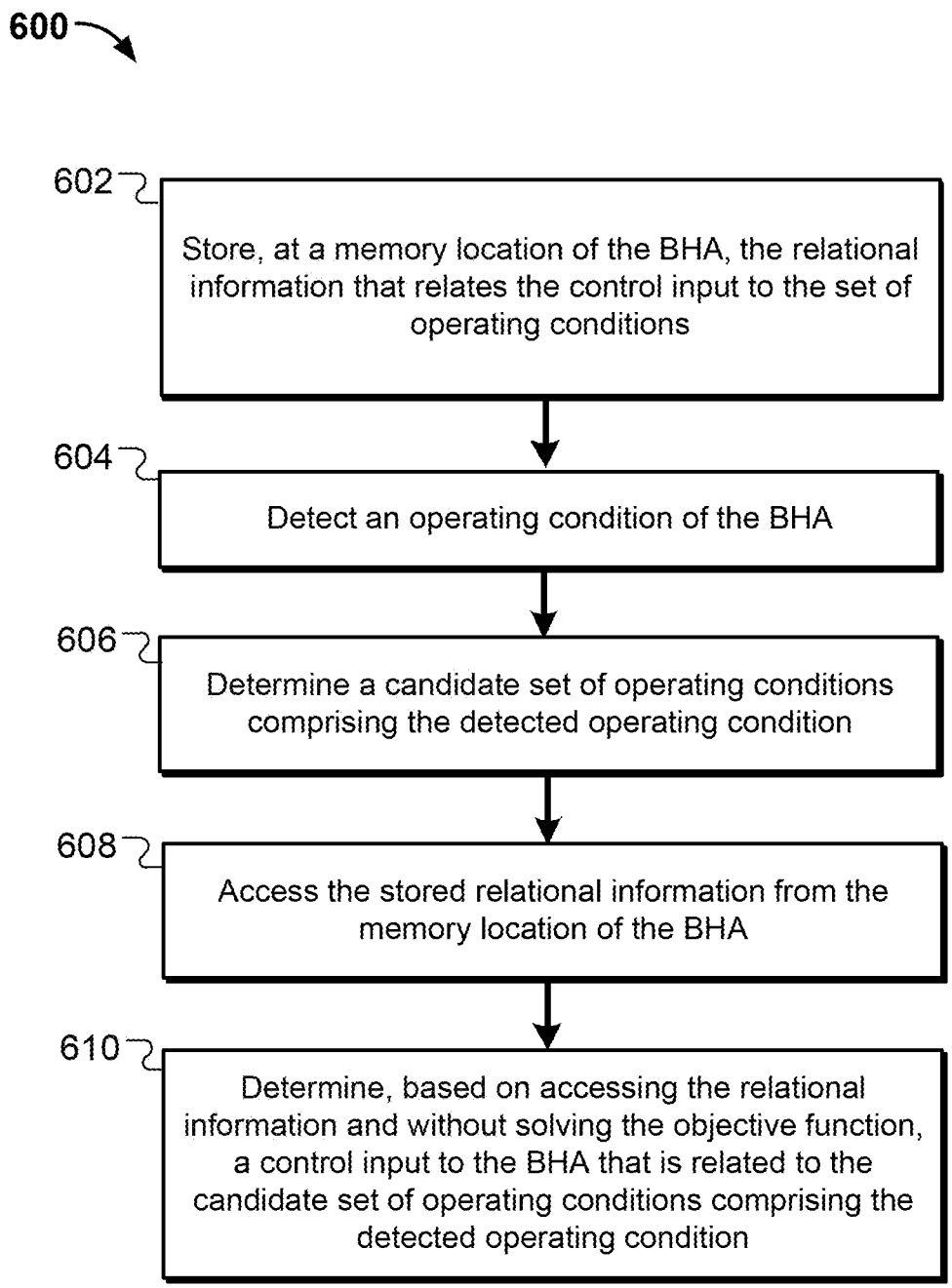
FIG. 6 is a flow chart of an example process for accessing relational information at a BHA and determining a control input to apply for a detected operating condition.

FIG. 6 is a flow chart of an example process 600 for accessing relational information and determining a control input to apply for a detected operating condition. One or more steps of the example process of FIG. 6 may be performed by the BHA (e.g., BHA 118 in FIG. 1). In some examples, the process 600 may be performed subsequent to step 510 in FIG. 5, after the BHA received relational information from the secondary system. In this example, the BHA stores, at a memory location of the BHA, the relational information that relates the control input to the set of operating conditions (602). The BHA then detects an operating condition of the BHA (604). For example, the operating condition may be a part or current operating condition determined from sensors measurements, or may be a predicted operating condition based on model-based predictions. The BHA then determines a candidate set of operating conditions including the detected operating condition (606). The BHA accesses the stored relational information from the memory location of the BHA (608) and determines, based on accessing the relational information and without solving the objective function, a control input to the BHA that is related to the candidate set of operating conditions including the detected operating condition (610).

Figure 7:
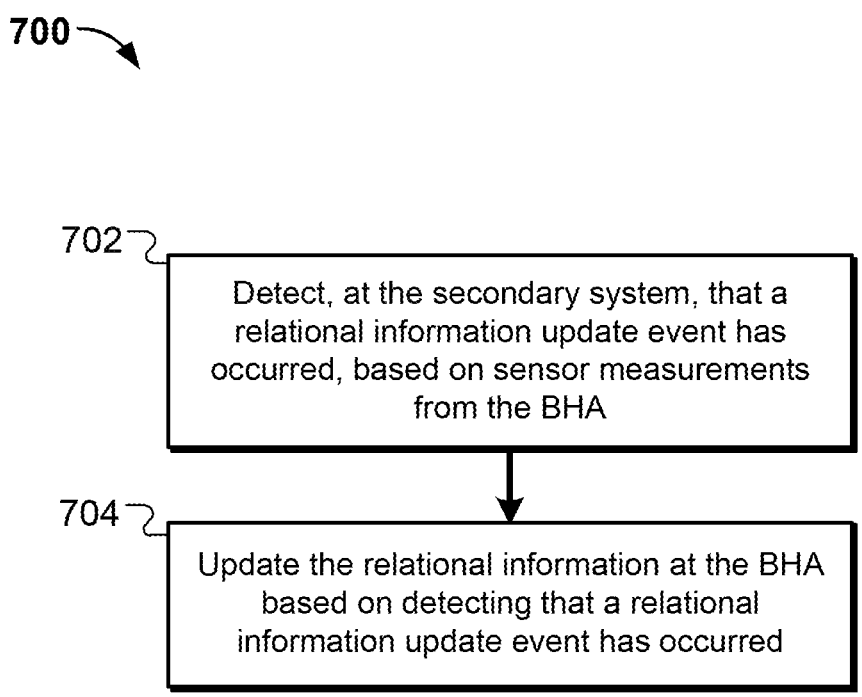
FIG. 7 is a flow chart of an example of further processing to update a model of BHA dynamics and update relational information provided to the BHA.

FIG. 7 is a flow chart of an example of further processing to update a model of BHA dynamics and update relational information provided to the BHA. The example process 700 may be performed by a secondary system (e.g., the controller 132 in FIG. 1) and may be performed, for example, at a time subsequent to step 510 in FIG. 5. In this example, the controller detects that a relational information update event has occurred, based on sensor measurements from the BHA (702). The relational information update event may be defined according to any suitable criterion, an example of which is provided in FIG. 8 below. The controller then updates the relational information at the BHA based on detecting that a relational information update event has occurred (704).

Figure 8:
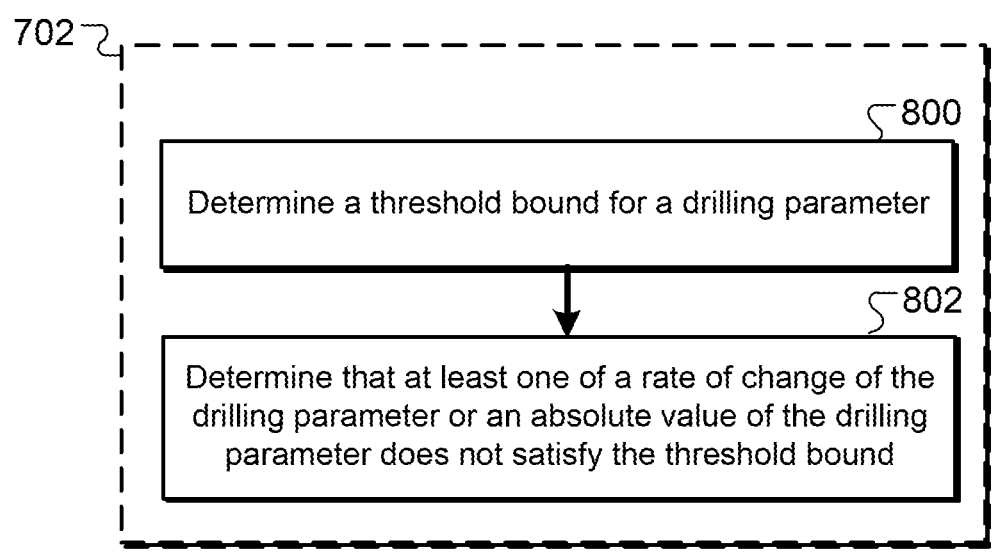
FIG. 8 is a flow chart of an example of further details of detecting that a relational information update event has occurred, based on sensor measurements from the BHA.

FIG. 8 is a flow chart of an example of further details of detecting that a relational information update event has occurred, based on sensor measurements from the BHA (e.g., step 702 in FIG. 7). In this example, the controller determines a threshold bound for a drilling parameter (800). The drilling parameter may be related to a design objective, a predicted wellbore trajectory, or a sensor measurement. Examples of drilling parameters include a desired control performance, a communication bandwidth between the secondary system and the BHA, or a processing capability of the secondary system. The controller then determines that at least one of a rate of change of the drilling parameter or an absolute value of the drilling parameter does not satisfy the threshold bound (802).

Figure 9:
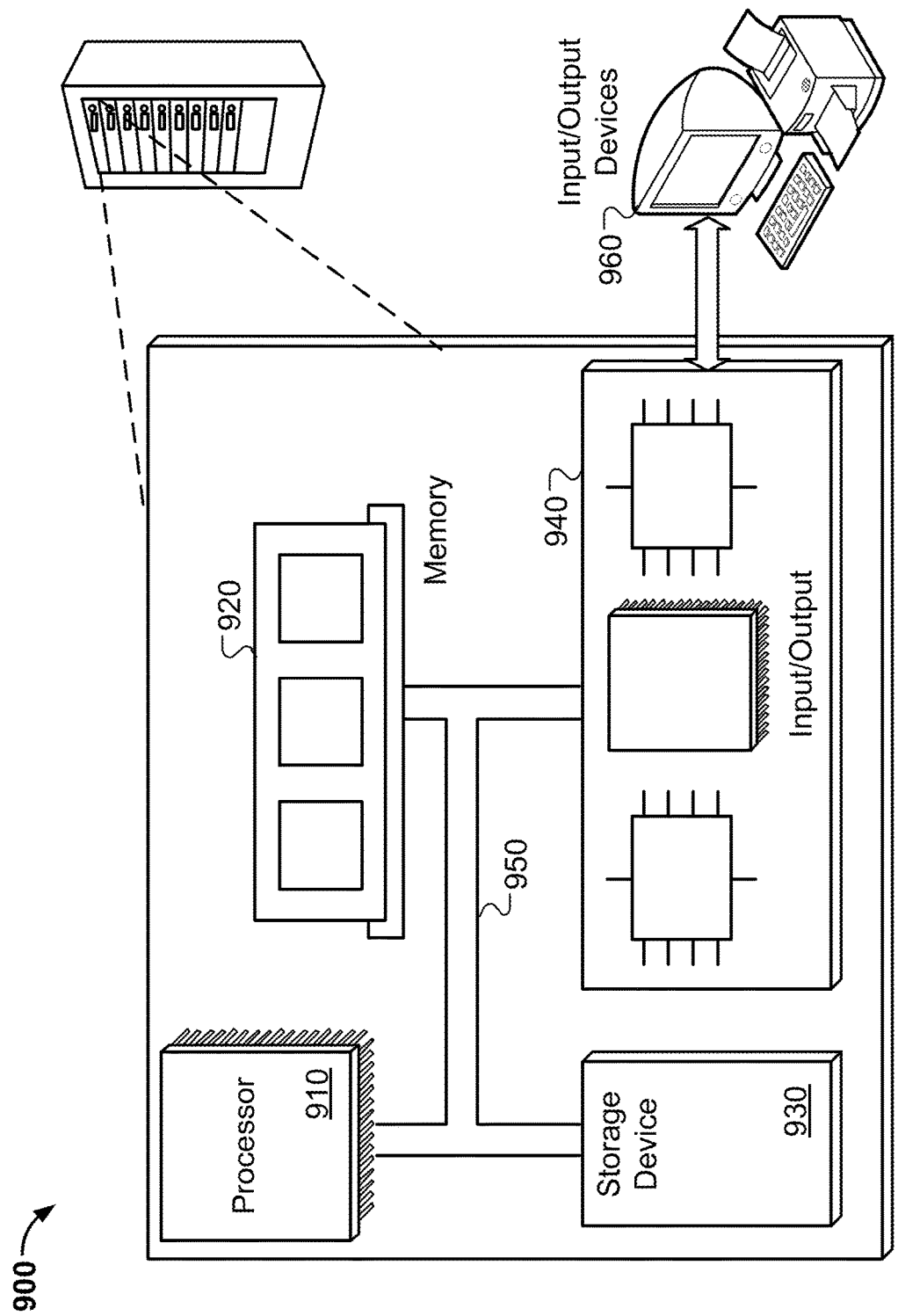
FIG. 9 is a block diagram of an example of a control system on which some examples may operate.

FIG. 9 is a block diagram of an example of a computer system 900. For example, referring to FIG. 1, one or more parts of the controller 132 could be an example of the system 900 described here, such as a computer system used by any of the users who access resources of the wellbore system 100. The system 900 includes a processor 910, a memory 920, a storage device 930, and an input/output device 940. Each of the components 910, 920, 930, and 940 can be interconnected, for example, using a system bus 950. The processor 910 is capable of processing instructions for execution within the system 900. In some implementations, the processor 910 is a single-threaded processor. In some implementations, the processor 910 is a multi-threaded processor. In some implementations, the processor 910 is a quantum computer. The processor 910 is capable of processing instructions stored in the memory 920 or on the storage device 930. The processor 910 may execute operations such as generating control inputs that satisfy an objective function, generating relational information, sending the relational information to the BHA, applying control inputs indicated by the relational information, etc. (e.g., FIGS. 5-8).

The memory 920 stores information within the system 900. In some implementations, the memory 920 is a computer-readable medium. In some implementations, the memory 920 is a volatile memory unit. In some implementations, the memory 920 is a non-volatile memory unit.

The storage device 930 is capable of providing mass storage for the system 900. In some implementations, the storage device 930 is a computer-readable medium. In various different implementations, the storage device 930 can include, for example, a hard disk device, an optical disk device, a solid-date drive, a flash drive, magnetic tape, or some other large capacity storage device. In some implementations, the storage device 930 may be a cloud storage device, e.g., a logical storage device including multiple physical storage devices distributed on a network and accessed using a network. In some examples, the storage device may store long-term data, such as rock formation data or ROP design capabilities. The input/output device 940 provides input/output operations for the system 900. In some implementations, the input/output device 940 can include one or more of a network interface devices, e.g., an Ethernet card, a serial communication device, e.g., an RS-232 port, and/or a wireless interface device, e.g., an 802.11 card, a 3G wireless modem, a 4G wireless modem, or a carrier pigeon interface. A network interface device allows the system 900 to communicate, for example, transmit and receive instructions to and from the controller 132 in FIG. 1. In some implementations, the input/output device can include driver devices configured to receive input data and send output data to other input/output devices, e.g., keyboard, printer and display devices 960. In some implementations, mobile computing devices, mobile communication devices, and other devices can be used.

A server (e.g., a server forming a portion of the controller 132 or the wellbore system 100 shown in FIG. 1) can be realized by instructions that upon execution cause one or more processing devices to carry out the processes and functions described above, for example, such as generating control inputs that satisfy an objective function, generating relational information, sending the relational information to the BHA, and applying control inputs indicated by the relational information, etc. (e.g., FIGS. 5-8). Such instructions can include, for example, interpreted instructions such as script instructions, or executable code, or other instructions stored in a computer readable medium. Different components of a wellbore system 100 can be distributively implemented over a network, such as a server farm, or a set of widely distributed servers or can be implemented in a single virtual device that includes multiple distributed devices that operate in coordination with one another. For example, one of the devices can control the other devices, or the devices may operate under a set of coordinated rules or protocols, or the devices may be coordinated in another fashion. The coordinated operation of the multiple distributed devices presents the appearance of operating as a single device.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations have been described. Nevertheless, it will be understood that various modifications may be made. For example, additional aspects of processes 500 and 600 may include more steps or fewer steps than those illustrated in FIGS. 7 and 8. Further, the steps illustrated in FIGS. 5 to 8 may be performed in different successions than that shown in the figures. Moreover, although the concepts have been described in the context of a wellbore drilling system, the concepts could be applied to other processes as well. For example, in connection with medical endoscopic examination or other applications where an instrument is inserted and controlled inside of an unknown environment. Accordingly, other implementations are within the scope of the following claims.

What is claimed is:

1. A computer-implemented method of controlling a bottom hole assembly (BHA), the method comprising:
   determining a model of BHA dynamics based on sensor measurements from the BHA;
   determining, based on the model of BHA dynamics, an objective function comprising a predicted future deviation from a planned wellbore path;
   determining a control input to the BHA to reduce deviation between a desired and predicted trajectory, without an intermediate operation, that satisfies the objective function for a set of operating conditions of the BHA, wherein the control input controls the BHA to reduce the deviation;
   generating, at a secondary system, relational information that relates the control input to the set of operating conditions, further comprising:
      determining a first control input to the BHA that satisfies the objective function for a first set of operating conditions of the BHA;
      determining a second control input to the BHA that satisfies the objective function for a second set of operating conditions of the BHA;
      determining that the first control input to the BHA and the second control input to the BHA are identical to each other;
      combining the first set of operating conditions and the second set of operating conditions into a combined set of operating conditions; and
      relating, in the relational information, the combined set of operating conditions to a single control input that corresponds to both the first and second control inputs;
   transmitting the relational information from the secondary system to the BHA; and
   controlling the BHA using the relational information.

2. The computer-implemented method of claim 1, further comprising:
   storing, at a memory location of the BHA, the relational information that relates the control input to the set of operating conditions;
   detecting an operating condition of the BHA;
   determining a candidate set of operating conditions comprising the detected operating condition;
   accessing the relational information from the memory location of the BHA; and
   determining, based on accessing the relational information, a control input to the BHA that is related to the candidate set of operating conditions comprising the detected operating condition.

3. The computer-implemented method of claim 2, wherein determining, based on accessing the relational information, a control input to the BHA is performed without performing computations to solve the objective function for a control input that satisfies the objective function.

4. The computer-implemented method of claim 1, wherein generating, at a secondary system, relational information that relates the control input to the set of operating conditions comprises: generating a relational database that relates the control input to the set of operating conditions.

5. The computer-implemented method of claim 1, further comprising:
   detecting, at the secondary system and based on sensor measurements from the BHA, that a relational information update event has occurred; and
   updating the relational information at the BHA based on detecting that a relational information update event has occurred.

6. The computer-implemented method of claim 5, wherein updating the relational information at the BHA comprises:
   determining an updated model of BHA dynamics based on updated sensor measurements from the BHA;
   determining an updated objective function based on the updated model of BHA dynamics;
   determining an updated control input to the BHA that satisfies the updated objective function for the set of operating conditions of the BHA;
   generating, at the secondary system, updated relational information that relates the updated control input to the set of operating conditions; and transmitting the updated relational information from the secondary system to the BHA.

7. The computer-implemented method of claim 6, wherein transmitting the updated relational information from the secondary system to the BHA comprises:
   determining a difference between the updated relational information and the relational information; and
   transmitting the difference between the updated relational information and the relational information from the secondary system to the BHA.

8. The computer-implemented method of claim 5, wherein detecting that a relational information update event has occurred comprises:
   determining a threshold bound for a drilling parameter; and
   determining that at least one of a rate of change of the drilling parameter or an absolute value of the drilling parameter does not satisfy the threshold bound.

9. The computer-implemented method of claim 8, wherein determining a threshold bound further comprises determining the threshold bound based on at least one of a desired control performance, a communication bandwidth between the secondary system and the BHA, or a processing capability of the secondary system.

10. The computer-implemented method of claim 5, further comprising implementing a constraint on the control input to the BHA while updating the relational information at the BHA.

11. The computer-implemented method of claim 1, wherein transmitting the relational information from the secondary system to the BHA comprises transmitting the relational information and the model of BHA dynamics from an above-surface location of the secondary system to the BHA.

12. The computer-implemented method of claim 1, wherein transmitting the relational information from the secondary system to the BHA comprises transmitting the relational information and the model of BHA dynamics from a below-surface location of the secondary system to the BHA.

13. The computer-implemented method of claim 1, wherein determining an objective function comprises:
   determining a weighting factor based on at least one of the model of BHA dynamics or the sensor measurements from the BHA; and
   determining a weighted combination of the predicted future deviation from the planned wellbore path and a predicted future cost of applying a control input to the BHA, weighted by the weighting factor.

14. The computer-implemented method of claim 1, wherein determining a control input to the BHA that satisfies the objective function for a set of operating conditions comprises determining a control input to the BHA that minimizes a weighted combination of the predicted future deviation from the planned wellbore path and a predicted future cost of applying the control input to the BHA over a subsequent period of time during which the model of BHA dynamics satisfies the set of operating conditions.

15. The computer-implemented method of claim 14, wherein the predicted future cost of applying a control input to the BHA comprises at least one of a predicted energy consumption for the BHA, a predicted torque on the BHA, a predicted fluid flow to the BHA, a predicted angular position of the BHA, or a predicted financial cost.

16. The computer-implemented method of claim 1, further comprising:
   determining a candidate control input to the BHA;
   determining a predicted wellbore trajectory, based on the candidate control input to the BHA and the model of BHA dynamics; and
   determining the predicted future deviation from the planned wellbore path based on a deviation between the predicted wellbore trajectory and the planned wellbore path.

17. The computer-implemented method of claim 1, wherein determining a control input to the BHA comprises determining at least one of a first bend angle control, a second bend angle control, a first packer control, or a second packer control.

18. A system comprising:
   a first component located at or near a terranean surface;
   a bottom hole assembly (BHA) at least partially disposed within a wellbore at or near a subterranean zone, the BHA associated with at least one sensor; and
   a controller communicably coupled to the first component and the BHA, the controller operable to perform operations comprising:
      determining a model of BHA dynamics based on sensor measurements from the BHA;
      determining, based on the model of BHA dynamics, an objective function comprising a predicted future deviation from a planned wellbore path;
      determining a control input to the BHA to reduce deviation between a desired and predicted trajectory, without an intermediate operation, that satisfies the objective function for a set of operating conditions of the BHA, wherein the control input controls the BHA to reduce the deviation;
      generating, at a secondary system, relational information that relates the control input to the set of operating conditions, further comprising:
         determining a first control input to the BHA that satisfies the objective function for a first set of operating conditions of the BHA;
         determining a second control input to the BHA that satisfies the objective function for a second set of operating conditions of the BHA;
         determining that the first control input to the BHA and the second control input to the BHA are identical to each other;
         combining the first set of operating conditions and the second set of operating conditions into a combined set of operating conditions; and
         relating, in the relational information, the combined set of operating conditions to a single control input that corresponds to both the first and second control inputs;
      transmitting the relational information from the secondary system to the BHA; and
      controlling the BHA using the relational information.

19. A non-transitory computer-readable storage medium encoded with at least one computer program comprising instructions that, when executed, operate to cause at least one processor to perform operations for controlling drilling of a bottom hole assembly (BHA) in a borehole, the operations comprising:
   determining a model of BHA dynamics based on sensor measurements from the BHA;
   determining, based on the model of BHA dynamics, an objective function comprising a predicted future deviation from a planned wellbore path;
   determining a control input to the BHA to reduce deviation between a desired and predicted trajectory, without an intermediate operation, that satisfies the objective function for a set of operating conditions of the BHA, wherein the control input controls the BHA to reduce the deviation;

generating, at a secondary system, relational information that relates the control input to the set of operating conditions, further comprising:
- determining a first control input to the BHA that satisfies the objective function for a first set of operating conditions of the BHA;
- determining a second control input to the BHA that satisfies the objective function for a second set of operating conditions of the BHA;
- determining that the first control input to the BHA and the second control input to the BHA are identical to each other;
- combining the first set of operating conditions and the second set of operating conditions into a combined set of operating conditions; and
- relating, in the relational information, the combined set of operating conditions to a single control input that corresponds to both the first and second control inputs;

transmitting the relational information from the secondary system to the BHA; and controlling the BHA using the relational information.

* * * * *